United States Patent
Ishihara et al.

(10) Patent No.: US 8,896,542 B2
(45) Date of Patent: *Nov. 25, 2014

(54) PORTABLE TERMINAL DEVICE AND DISPLAY CONTROL METHOD

(71) Applicant: Panasonic Intellectual Property Corporation of America, Torrance, CA (US)

(72) Inventors: Tomohiro Ishihara, Kanagawa (JP); Kazumasa Gomyo, Kanagawa (JP); Satoshi Iino, Kanagawa (JP); Yuji Hashimoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,796

(22) Filed: Apr. 30, 2013

(65) Prior Publication Data

US 2013/0234950 A1    Sep. 12, 2013

Related U.S. Application Data

(63) Continuation of application No. 12/810,840, filed as application No. PCT/JP2008/003383 on Nov. 19, 2008, now Pat. No. 8,456,426.

(30) Foreign Application Priority Data

Dec. 28, 2007 (JP) .................. 2007-340356

(51) Int. Cl.
| | | |
|---|---|---|
| G06F 3/02 | (2006.01) | |
| G09G 5/00 | (2006.01) | |
| G06F 1/16 | (2006.01) | |
| G06F 3/0488 | (2013.01) | |
| H04M 1/725 | (2006.01) | |
| H04M 1/02 | (2006.01) | |

(52) U.S. Cl.
CPC ............. *G06F 3/02* (2013.01); *H04M 1/72561* (2013.01); *H04M 1/72552* (2013.01); *G06F 1/1624* (2013.01); *H04M 2250/22* (2013.01); *H04M 1/0235* (2013.01); *H04M 1/72583* (2013.01); *G06F 3/04886* (2013.01); *H04M 2250/18* (2013.01); *H04M 1/0245* (2013.01)
USPC ......................... 345/169; 345/173; 455/575.3

(58) Field of Classification Search
USPC ............ 345/156–184; 455/566, 575.3, 575.4; 341/22, 23, 34; 340/407.2
See application file for complete search history.

(56) References Cited

U.S. PATENT DOCUMENTS

| | | |
|---|---|---|
| 7,599,830 B2 | 10/2009 | Babu |
| 2003/0095110 A1 | 5/2003 | Ukita |

(Continued)

FOREIGN PATENT DOCUMENTS

| | | |
|---|---|---|
| JP | 11-353283 | 12/1999 |
| JP | 2000-10713 | 1/2001 |

(Continued)

OTHER PUBLICATIONS

Explanation of Circumstances Regarding Accelerated Examination dated Jul. 25, 2012.

(Continued)

*Primary Examiner* — Stephen Sherman
(74) *Attorney, Agent, or Firm* — Dickinson Wright PLLC

(57) ABSTRACT

A portable terminal device has enclosures with a movable portion, a display section that displays visible information showing an operation target area, and a touch sensor that detects a position on a display screen of the display section touched by a user's finger, or the like. A shape detection section detects a change in the shape of the enclosure; an input operation management section manages a position detected by the touch sensor and an operation target area of each of pieces of visible information displayed on the display section in an associated manner; and a display control section automatically makes a change to at least display positions of the respective pieces of visible information about the operation target displayed on the display section in accordance with a change in shape of the enclosure detected by the shape detection section.

8 Claims, 12 Drawing Sheets

(56) References Cited

U.S. PATENT DOCUMENTS

| | | |
|---|---|---|
| 2003/0210280 A1 | 11/2003 | Baker |
| 2005/0085280 A1 | 4/2005 | Takahashi |
| 2006/0274051 A1 | 12/2006 | Longe |
| 2007/0049358 A1 | 3/2007 | Kang |
| 2007/0135104 A1 | 6/2007 | Suzuki |
| 2008/0070648 A1 | 3/2008 | Kang |
| 2008/0207272 A1 | 8/2008 | Thornton |
| 2010/0281416 A1 | 11/2010 | Fuyuno |

FOREIGN PATENT DOCUMENTS

| | | |
|---|---|---|
| JP | 2001-290580 | 10/2001 |
| JP | 2002-268776 | 9/2002 |
| JP | 2003-140804 | 5/2003 |
| JP | 2004-128780 | 4/2004 |
| JP | 2005-122271 | 5/2005 |
| JP | 2006-039485 | 2/2006 |
| JP | 2006-067532 | 3/2006 |
| JP | 2006-311224 | 11/2006 |
| JP | 2006-314128 | 11/2006 |
| JP | 2007-036544 | 2/2007 |
| JP | 2007-043497 | 2/2007 |
| JP | 2007-48123 | 2/2007 |
| JP | 2007-74716 | 3/2007 |
| JP | 2007-133806 | 5/2007 |
| WO | 2009-084432 | 7/2009 |

OTHER PUBLICATIONS

Explanation of Circumstances Concerning Accelerated Examination, mailed Oct. 14, 2011, for JP 2011-227234, 8 pages.

International Search Report, International Application No. PCT/JP2008/003383 filed Nov. 19, 2008.

FIG. 4

EXTENDED-CONTRACTED MODE PATTERNS

| | CONTRACTED MODE | EXTENDED MODE |
|---|---|---|
| FIRST MODE | SCREEN CONFIGURATION INCLUDING OBJECTS ARRANGED OVER ENTIRETY OF BOTH SURFACES [CONTRACTED 1] | SCREEN CONFIGURATION IN WHICH OBJECTS ARE ARRANGED IN LOWER PORTION OF SCREEN [EXTENDED 1-1], [EXTENDED 1-2] |
| SECOND MODE | SCREEN CONFIGURATION THAT ENABLES DIRECT TOUCH OPERATION OF ANY AREA ON SCREEN [CONTRACTED 2] | SCREEN CONFIGURATION IN WHICH POINTER IS DISPLAYED ON SCREEN AND IN WHICH POINTER OPERATION SCREEN IS ARRANGED IN LOWER PORTION OF SCREEN [EXTENDED 2-1], [EXTENDED 2-2] |
| THIRD MODE | SCREEN CONFIGURATION THAT ENABLES DIRECT TOUCH OPERATION OF ANY AREA ON SCREEN [CONTRACTED 3] | SCREEN CONFIGURATION IN WHICH OPERATION SCREEN FOR VERTICALLY MOVING SCREEN IS ARRANGED IN LOWER PORTION OF SCREEN [EXTENDED 3] |
| FOURTH MODE | SCREEN CONFIGURATION IN WHICH VIRTUAL KEYBOARD AND CONVERSION CANDIDATE SELECTION SCREEN ARE ARRANGED [CONTRACTED 4] | SCREEN CONFIGURATION IN WHICH CONVERSION CANDIDATE SELECTION SCREEN IS ARRANGED IN LOWER PORTION OF SCREEN [EXTENDED 4] |
| FIFTH MODE | SCREEN CONFIGURATION IN WHICH VIRTUAL KEYBOARD (JAPANESE INPUT, OR THE LIKE) IS ARRANGED [CONTRACTED 5] | SCREEN CONFIGURATION IN WHICH VIRTUAL KEYBOARD HAVING INPUT FUNCTION (ENTRY OF SYMBOLS, PICTOGRAMS, AND THE LIKE) DIFFERING FROM THAT FOR OPEN MODE IS ARRANGED IN LOWER PORTION OF SCREEN [EXTENDED 5] |

FIG. 12

DISPLAY MODE MANAGEMENT TABLE 28B

| TERMINAL STATUS | TERMINAL SHAPE | TRANSITION MODE |
|---|---|---|
| A (EXAMPLE, SELECT OBJECT) | CONTRACTED | CONTRACTED 1 MODE |
| | EXTENDED | EXTENDED 1 MODE |
| B (EXAMPLE, WEB BROWSER) | CONTRACTED | CONTRACTED 2 MODE |
| | EXTENDED | EXTENDED 2 MODE |
| C (EXAMPLE, CHARACTER INPUT) | CONTRACTED | CONTRACTED 4 MODE |
| | EXTENDED | EXTENDED 4 MODE | though content.

PORTABLE TERMINAL DEVICE AND DISPLAY CONTROL METHOD

CROSS REFERENCE TO RELATED APPLICATIONS

This is a continuation application of application Ser. No. 12/810,840 filed Jun. 26, 2010, which is a 371 application of PCT/JP2008/003383 filed Nov. 19, 2008, which is based on Japanese Application No. 2007-340356 filed Dec. 28, 2007, the entire contents of each of which are incorporated by reference herein.

TECHNICAL FIELD

The present invention relates to a portable terminal device having a deformable enclosure and a touch panel for input operation purpose, a display control method for controlling the portable terminal device, and a display control program.

BACKGROUND ART

For instance, in relation to devices, such as portable phone terminals and portable information terminals (PDAs), there is an increasing number of models equipped with touch panels for input operation purpose. A touch panel of this type has a touch sensor arranged so as to superpose a display screen. When a user touches the display screen by use of his/her finger or a pointed pen (a stylus), the touch sensor detects a contacted position. The thus-detected position and a position of a button or icon appearing on the screen are compared with each other, whereby a determination is made as to whether or not the user has operated the button or icon on the screen.

Adoption of such a touch panel enables omission of a keyboard, or the like, including a plurality of physical switches or buttons. Further, since a change can be made to the number, shapes, layout, and the like, of buttons or icons displayed on the screen when necessary, a higher degree of freedom is accomplished.

An example known related-art technique about a portable terminal using a touch panel is described in connection with Patent document 1.

A portable phone terminal, or the like, often employs an enclosure of a structure that becomes comparatively smaller when carried and that can be folded into a size which makes the terminal easy to handle during use, or an enclosure of a structure that enables deformation.

For instance, Patent Document 2 describes an enclosure that includes two members arranged in an overlapping fashion and that is configured such that the two members make relative movements (sliding actions), thereby enabling expansion and contraction of the enclosure.

Incidentally, in reality, it is often the case where even a portable terminal using a touch panel is equipped with an operation section (hereinafter called a "stationary operation section") including a plurality of physical switches and buttons other than the touch panel. Specifically, there are also cases where a restriction is imposed on the number of buttons displayable on a touch panel or a size of buttons displayable on a touch panel becomes smaller. Under a circumstance where input operability is of importance as in a case of; for instance, preparation of a text, it is easy for the user to use a stationary operation section, such as a keyboard including a plurality of buttons, than the touch panel.

However, the terminal is equipped with both the touch panel and the stationary operation section, the terminal becomes larger in size. Accordingly, some commercially-available existing products of portable terminals adopt a slide enclosure, such as that described in connection with Patent Document 2. The enclosure is configured so as to become usable in both states; namely, a state where a stationary operation section is housed in a terminal when the user deforms the enclosure in an expanding or contracting manner and another state in which the stationary operation section becomes exposed on a front face of the terminal.

Patent Document 1: JP-A-2002-268776
Patent Document 2: JP-A-2006-314128

DISCLOSURE OF THE INVENTION

Problem that the Invention is to Solve

Incidentally, for instance, when the portable phone terminal is operated, the user usually holds the portable phone terminal with one hand and operates respective buttons, or the like, of the operation section on the terminal while moving the thumb of the same hand. Even when the portable terminal equipped with such a touch panel is operated, conceivable, desirable operation is the user holding the terminal with one hand and operating the buttons, or the like, on the touch panel of the terminal while moving the thumb of the same hand. Specifically, since the user sensitively memorizes positions of the respective buttons, the user familiarized with operation of the buttons does not need to see the buttons during operation involving movement of the single thumb and can intuitively perform high-speed input operation.

However, when the number of buttons to be operated is extremely large and when the buttons are arranged over a comparatively wide area, it is difficult for the user to hold the terminal with one hand and operate all of the buttons by moving only the single thumb. For instance, in a case where there is operated a terminal having, as an operation section both a touch panel and a stationary operation section, when an attempt is made to enable simultaneous operation of both the stationary operation section and the touch panel by changing the shape of the enclosure of the terminal such that the stationary operation unit becomes exposed on the front face, buttons to be operated are present even at positions distant from a thumb joint, it is impossible to operate all of the buttons by mere movement of the thumb. Consequently, the user operates the terminal by use of both hands or operates the terminal by switching the hand to hold the terminal to the other hand or while shifting the position of the hand. Thus, superior operability cannot be achieved.

The present invention aims at providing a portable terminal device with superior operability that enables a user to operate all buttons to be operated, and the like, by moving only one finger of one hand carrying the terminal when operating the terminal equipped with both a touch panel and a stationary operation section.

Means for Solving the Problem

The objective of the present invention is accomplished by the following configuration.

A mode of a portable terminal device of the present invention is a portable terminal device, comprising:

an enclosure including a movable portion for changing a shape into at least two states;

a display section configured to display arbitrary visible information showing an operation target area;

a touch sensor that detects a position on a display screen of the display section touched by a user's finger, or the like;

a shape detection section that detects a change in the shape of the enclosure;

an input operation management section that manages a position detected by the touch sensor and an operation target area of respective pieces of visible information displayed on the display section in an associated manner; and a display control section that automatically changes at least display position of the respective pieces of visible information about the operation target displayed on the display section in accordance with the change in shape of the enclosure detected by the shape detection section.

In the portable terminal device, the display control section automatically changes display positions of the respective pieces of visible information to be operated that are displayed on the display section, in accordance with a change in shape of the enclosure detected by the shape detection section. Therefore, the display is controlled so as to adapt to a user's actual usage pattern, so that operability can be improved. For instance, when the user changes the shape of the enclosure such that the stationary operation section becomes exposed and when both an operation button on the stationary operation section and a virtual button (visible information) displayed on respective sections of the display section are taken as operation targets, there still exist buttons located at distant positions where the buttons are not reached by movement of only one finger as mentioned previously. Therefore, operability is deteriorated. Accordingly, in a state where the stationary operation section remains exposed, the operation buttons on the stationary operation section and all virtual buttons on the display section can be arranged in a range over which the finger can move, so long as positions of the virtual buttons (visible information) displayed on the display section are relocated so as to become close to the stationary operation section. Thus, operability is enhanced.

A mode of the portable terminal device of the present invention is characterized in that the enclosure includes an upper enclosure and a lower enclosure which are configured to relatively move with each other by sliding or rotation;

the upper enclosure is equipped with the display section and the touch sensor;

the lower enclosure is equipped with a stationary operation section including a plurality of buttons fixed at physical positions where a user can operate the buttons; and the display control section preferentially arranges the display position of the respective pieces of visible information to be operated, which is displayed on the display section, to a position close to the stationary operation section within an entire display area of the display section when the shape detection section detects that a front face of the stationary operation section is exposed in accordance with the change in the shape of the enclosure.

In the portable terminal device, changing the shape of the enclosure makes it possible to house the stationary operation section in the enclosure and let the stationary operation section become exposed on the front face of the enclosure, to thus enable the user to perform operation. In a state where the stationary operation section remains exposed on the front face of the enclosure, both the virtual buttons (visible information) displayed in respective portions of the display section and operation buttons on the stationary operation section become targets to be operated by the user. However, so long as the positions of the virtual buttons (visible information) displayed on the display section are relocated so as to become close to the stationary operation section under control of the display control section, the operation buttons on the stationary operation section and all of the virtual buttons on the display section can be arranged within a range where the finger can move, so that operability is enhanced.

A mode of the portable terminal device of the present invention is characterized in that the display control section re-displays at a changed position the respective pieces of visible information to be operated, which is displayed on the display section, in a smaller size than the visible information in a predetermined standard state, when the shape detection section detects that a front face of the stationary operation section is exposed in accordance with the change in the shape of the enclosure.

In the portable terminal device, a display size of the virtual buttons (visible information) displayed on the display section is reduced, whereby a plurality of buttons can be arranged within a comparatively narrow area. Consequently, even in a state where the stationary operation section becomes exposed on the front face, all virtual buttons can be arranged within a range where the user's finger can reach the buttons without involvement of a reduction in the number of virtual buttons on the display section.

A mode of the portable terminal device of the present invention is characterized in that the display control section re-displays at a changed position some of pieces of displayable visible information among the respective pieces of visible information to be operated, which is displayed on the display section, and switches visible information to be displayed at the changed position in accordance with input operation for scrolling a display, when the shape detection section detects that a front face of the stationary operation section is exposed in accordance with the change in the shape of the enclosure.

In the portable terminal device, the number of virtual buttons (visual information) re-displayed in a comparatively narrow area at a relocation destination is reduced. Hence, it is not necessary to reduce the size of the respective virtual buttons, and it becomes possible to touch each of the buttons without fail even with a thick finger. Since the virtual buttons to be re-displayed are switched in accordance with operation for scrolling a display, the user can take all of the virtual buttons as targets of operation in the same manner before relocation of the virtual buttons.

A mode of the portable terminal device of the present invention is characterized in that the display control section displays on the display section a pointer showing an operation target position corresponding to an object on a content displayed on the display section when the shape detection section detects that a front face of the stationary operation section is exposed in accordance with the change in the shape of the enclosure, and further displays at a position close to the stationary operation section visible information to be operated which is assigned a function of commanding an arrangement of a display position of the pointer.

Even when objects (buttons and the like) to be operated are present over an entire area of displayed contents; for instance, a Web page displayed by a Web browser, the portable terminal device makes it possible to operate respective objects by mere operation of virtual buttons (visible information) in a range where a finger can reach the buttons. Specifically, the pointer is moved to an arbitrary position by operating the virtual buttons displayed at a position close to the finger, so that the respective object on the contents can be operated.

A mode of the portable terminal device of the present invention is characterized in that the display control section has a function of displaying on the display section, as an aggregate of the pieces of visible information, a virtual keyboard including a plurality of display buttons associated with a plurality of respective characters and a candidate display section for displaying candidates for conversion corresponding to the input character; and when the shape detection section detects that a front face of the stationary operation section is exposed in accordance with the change in the shape of the enclosure, the display control section deletes a display of the virtual keyboard and re-displays only the candidate display section at a changed position close to the stationary operation section in the entire display area of the display section.

In the portable terminal device, the virtual keyboard is displayed on the display section, whereby a text, or the like, can readily be input without use of the stationary operation section. Under a circumstance where the stationary operation section becomes exposed to be usable as a result of the shape of the enclosure being changed, the display of the virtual keyboard is erased, and only the candidate display section is re-displayed at a relocation destination close to the stationary operation section. Therefore, the stationary operation section and the candidate display section can be arranged within a range where the user's finger can reach the operation section.

A mode of the portable terminal device of the present invention is characterized in that the display control section has a function of displaying, as an aggregate of the pieces of visible information, the virtual keyboard including a plurality of display buttons associated with a plurality of respective characters on the display section; and when the shape detection section detects that a front face of the stationary operation section is exposed in accordance with the change in the shape of the enclosure, the display control section automatically switches characters assigned to respective display buttons included in the virtual keyboard to other contents which are different from characters of a predetermined standard state.

In the portable terminal device, the virtual keyboard is displayed on the display section, whereby a text, or the like, can readily be input without use of the stationary operation section. Moreover, under a circumstance where the stationary operation section becomes exposed to be usable as a result of changing of the shape of the enclosure, switching can be also performed in such a manner that virtual buttons, like special characters and symbols, other than the characters assigned to the respective buttons of the stationary operation section are assigned to the virtual keyboard, which is in turn helpful in improving operability.

A mode of the portable terminal device of the present invention is characterized by further comprising an operating status detection section that detects a type of an application program in operation, wherein the display control section automatically switches a configuration of a variable operation section displayed on the display section as the aggregate of the pieces of visible information, in accordance with a result of detection of the operating status detection section.

In the portable terminal device, the configuration of the variable operation section can be optimized so as to adapt to an actual usage pattern of the terminal. For instance, under a circumstance where an application program of a Web browser is being used, a frequency of clicking of various areas on contents displayed on the browser is high. Therefore, it is desirable to be able to readily operate operation buttons for displaying a movable cursor or moving the cursor. Further, under a circumstance where an application program; for instance, a text editor, is used, it is desirable to facilitate entry of a sequence of characters by displaying a virtual keyboard suitable for inputting a text.

A mode of a display control method of the present invention is characterized by a display control method for controlling a display of a portable terminal device including an enclosure having a movable portion for changing a shape into at least two states, a display section configured to display arbitrary visible information showing an operation target area, and a touch sensor that detects a position on a display screen of the display section touched by a user's finger, or the like, the method comprising:

managing a position detected by the touch sensor and the operation target area of respective pieces of visible information displayed on the display section in an associated manner; and automatically changing at least display positions of the respective pieces of visible information about the operation target displayed on the display section in accordance with the change in shape of the enclosure.

Under the display control method, display positions of the respective pieces of visible information about the operation targets displayed on the display section, and the like, are automatically changed in accordance with a detected change in the shape of the enclosure. The display is controlled so as to adapt to an actual usage pattern of the user, thereby making it possible to enhance operability.

A mode of a display control program of the present invention is characterized by a computer-executable display control program for controlling a display of a portable terminal device including an enclosure having a movable portion for changing a shape into at least two states, a display section configured to display arbitrary visible information showing an operation target area, and a touch sensor that detects a position on a display screen of the display section touched by a user's finger, or the like, the program comprising:

a step of managing a position detected by the touch sensor and an operation target area of respective pieces of visible information displayed on the display section in an associated manner; and a step of automatically changing at least display positions of the respective pieces of visible information about the operation target displayed on the display section in accordance with the change in shape of the enclosure.

As a result of the display control program being executed by a computer for controlling purpose, it becomes possible to control a display so as to adapt an actual usage pattern of the user as in the case of the foregoing portable terminal device, so that operability can be improved.

Advantage of the Invention

According to the present invention, there can be provided a portable terminal device with superior operability that enables a user to operate all buttons to be operated, and the like, by moving only one finger of one hand carrying the terminal when operating the terminal having both a touch panel and a stationary operation section.

BRIEF DESCRIPTION OF THE DRAWINGS

FIG. 4 It is a schematic diagram showing a specific example correspondence between changes in shape of an enclosure of the portable terminal device shown in FIG. 1 and available operation modes.

FIG. 12 It is a schematic view showing a specific example display mode management table provided in the portable terminal device shown in FIG. 10.

DESCRIPTIONS OF THE REFERENCE NUMERALS AND SYMBOLS

11 UPPER ENCLOSURE
12 LOWER ENCLOSURE
13 TOUCH PANEL
14 STATIONARY OPERATION SECTION
15 USER'S HAND
15a THUMB
16 VISIBLE INFORMATION (VARIABLE OPERATION SECTION)
16A, 16B, 16C, 16D, 16E, 16G, 16H, 16J ICONS
16M, 16P VIRTUAL KEYBOARD
16N CANDIDATE-FOR-CONVERSION DISPLAY SECTION
17 SCREEN DISPLAY SECTION
18 SHAPE CHANGE DETECTION SENSOR
19 MICROCOMPUTER
20 NUMERIC KEYPAD
21 SHAPE CHANGE DETECTION SECTION
22 DISPLAY MODE SWITCHING SECTION
23 SCREEN UPDATE SECTION
24 OPERATION DETECTION SECTION
25 DISPLAY MODE MANAGEMENT SECTION
26 DISPLAY MODE DETERMINATION SECTION
27 DISPLAY SCREEN GENERATION SECTION
27a EXTENDED MODE SCREEN GENERATION SECTION
27b CONTRACTED MODE SCREEN GENERATION SECTION
28, 28B DISPLAY MODE MANAGEMENT TABLE
29 TERMINAL STATUS MANAGEMENT SECTION
30 DISPLAY CONTENT
31 POINTER
32 INPUT MESSAGE DISPLAY SECTION

BEST MODES FOR IMPLEMENTING THE INVENTION

First Embodiment

A specific embodiment pertaining to a portable terminal device, a display control method, and a display control program of the present invention are hereunder described by reference to FIGS. 1 through 9.

Figure 1:
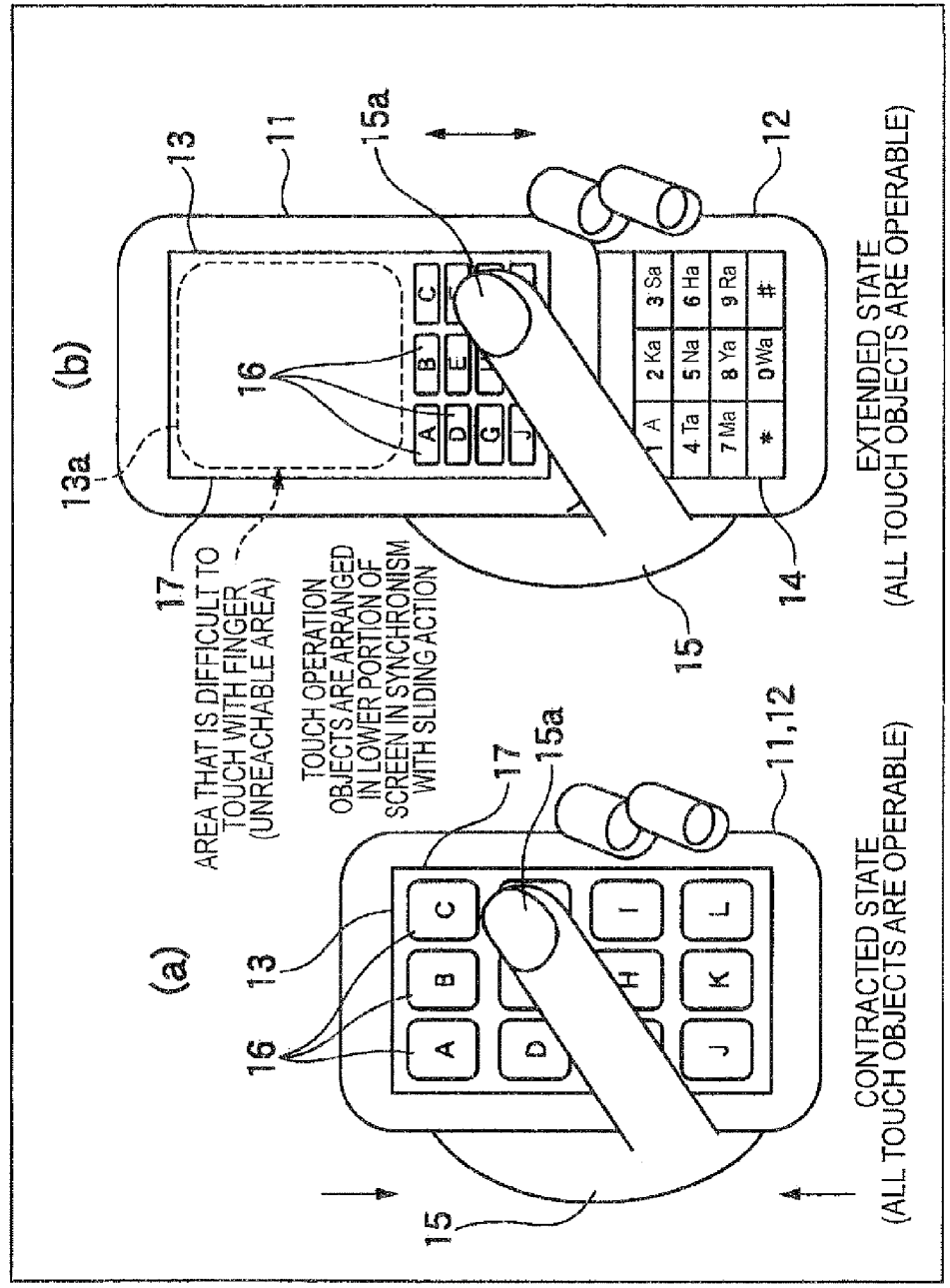
FIG. 1 It is a front view showing a specific example external view of a portable terminal device of a first embodiment.
Figure 2:
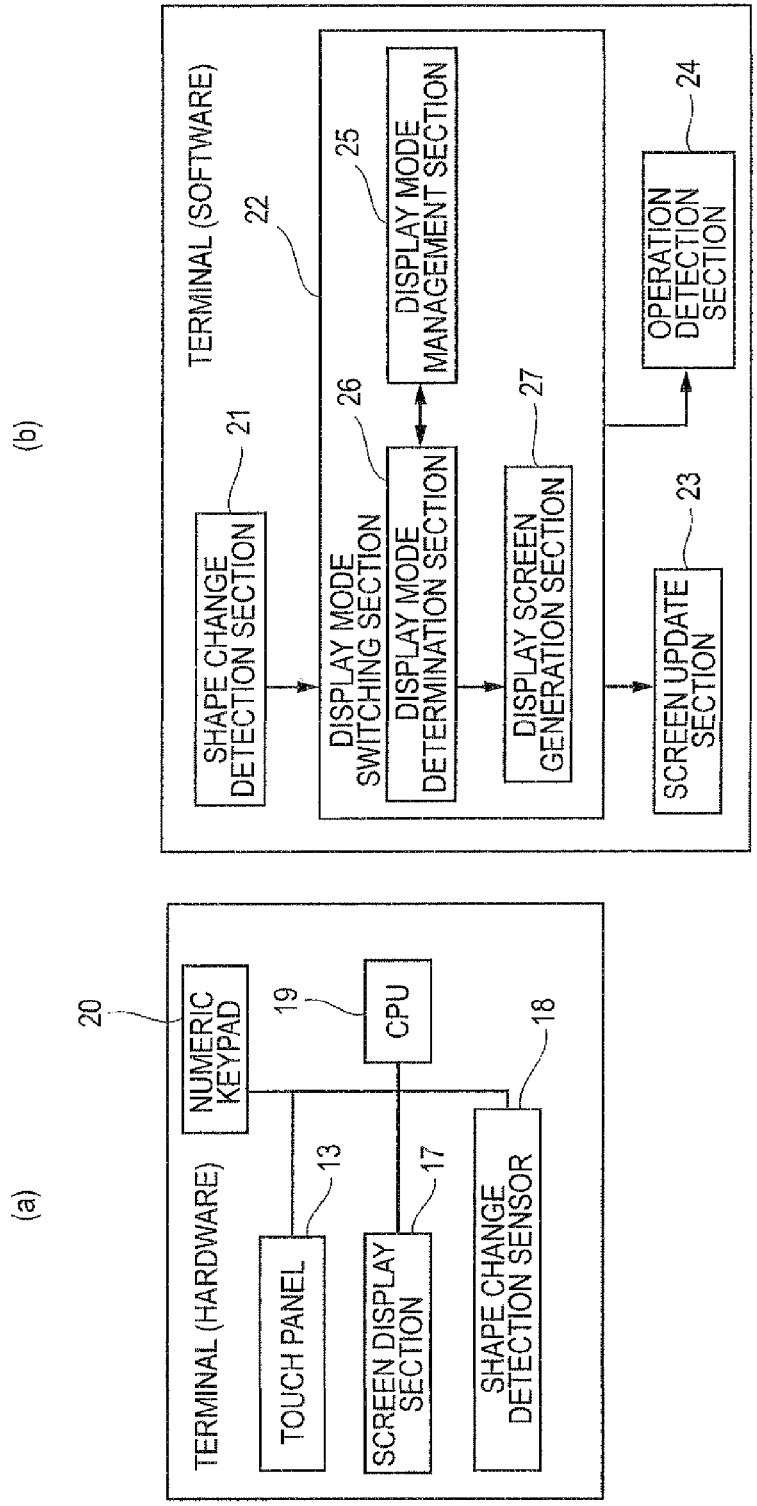
FIG. 2 It is a block diagram showing an example configuration of a principal section of hardware and software of the portable terminal device shown in FIG. 1.
Figure 3:
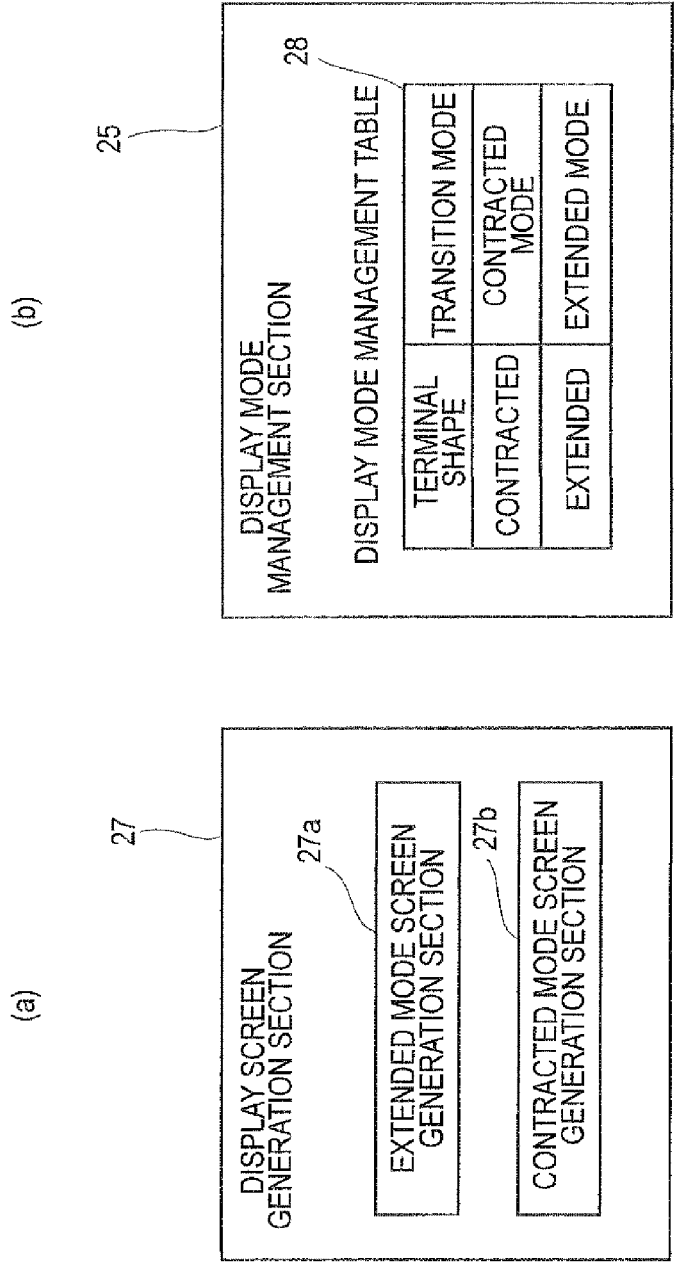
FIG. 3 It is a block diagram showing an internal block diagram of a display screen generation section and a display mode management section shown in FIG. 2.
Figure 5:
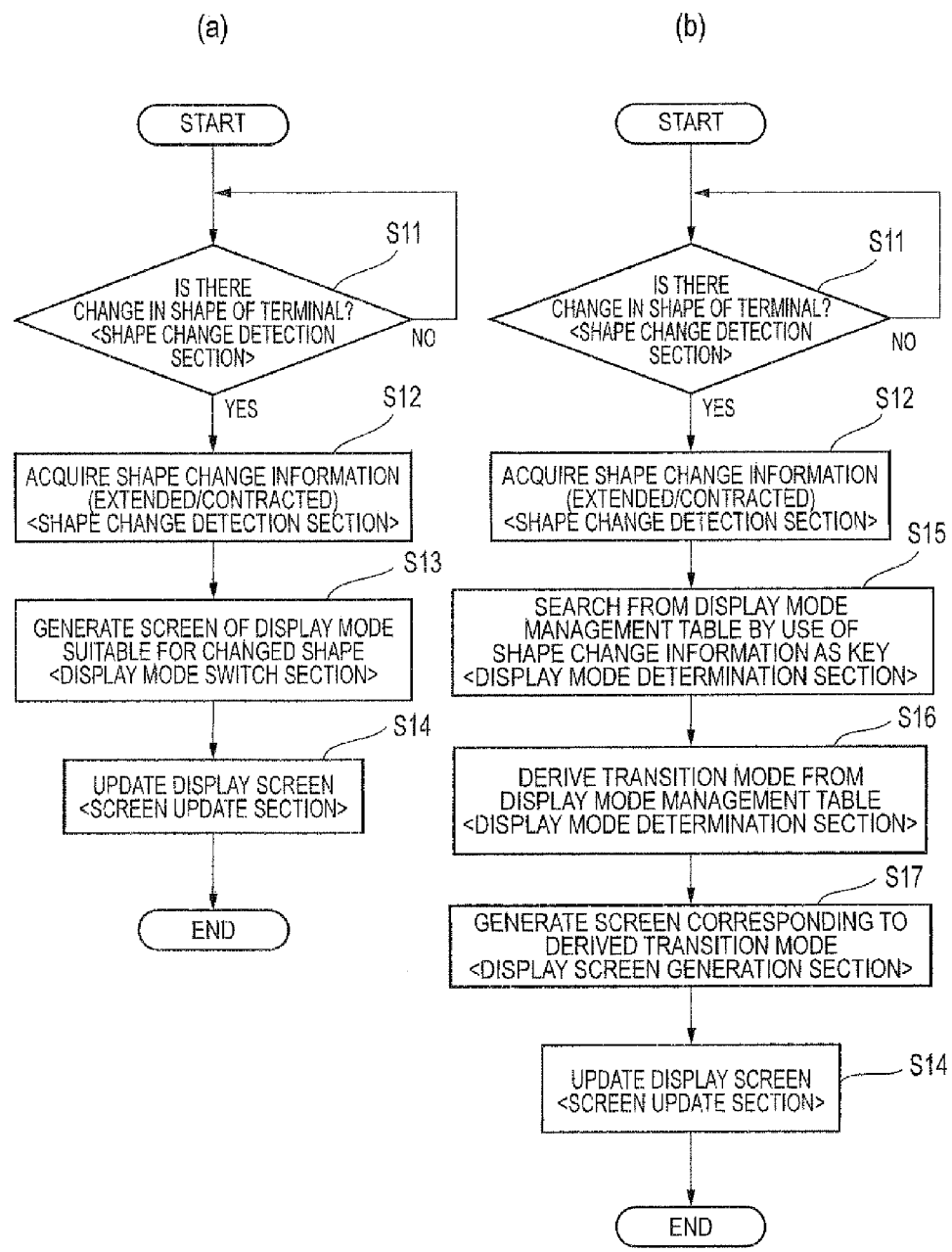
FIG. 5 It is a flowchart showing operation relating to a display on the portable terminal device shown in FIG. 1.

FIG. 1 is a front view showing a specific example external view of a portable terminal device of a first embodiment of the present invention. FIG. 2 is a block diagram showing an example configuration of a principal section of hardware and software of the portable terminal device shown in FIG. 1. FIG. 3 is a block diagram showing an internal configuration of a display screen generation section and a display mode management section shown in FIG. 2. FIG. 4 is a schematic diagram showing a specific example correspondence between changes in the shape of an enclosure of the portable terminal device shown in FIG. 1 and available operation modes. FIG. 5 is a flowchart showing operation pertaining to a display on the portable terminal device shown in FIG. 1. FIGS. 6 through 9 are front views showing specific example display contents pertaining to the screen of the portable terminal device shown in FIG. 1.

The present embodiment is based on an assumption that the present invention applies to a portable terminal device having an external view, such as that shown in FIG. 1. An estimated realistic portable terminal device to which the present invention applies is; for instance, a portable phone terminal, a portable information terminal (PDA), and the like.

The enclosure of the portable terminal device shown in FIG. 1 has a structure whose shape is changeable. Specifically, the enclosure has an upper enclosure 11 and a lower enclosure 12 that are independent of each other, as shown in FIG. 1(b). The enclosure is structured such that the upper enclosure 11 and the lower enclosure 12 can move (slide) relatively each other in a longitudinal direction (a direction designated by an arrow in the drawing) by user's operation. Accordingly, the enclosure of the portable terminal device is capable of extension and contraction. By user's manual operation, the upper enclosure 11 and the lower enclosure 12 can be caused to completely overlap each other, to thus assume a compact shape as shown in FIG. 1(a). Alternatively, as shown in FIG. 1(b), the upper enclosure 11 may also be upwardly moved, to thus make a stationary operation section 14 of the lower enclosure 12 exposed (extended) on a front face.

As shown in FIG. 1, the portable terminal device is provided with a screen display section 17 and a transparent touch panel 13 in an overlapping manner, and they are exposed on the front face of the enclosure. The screen display section 17 is made up of a liquid-crystal indicator and can display various pieces of visible information, such as a two-dimensional image, a text, a symbol, an icon, and the like.

The touch panel 13 can output a signal showing a touched position when the user touches a surface of the panel by use of a finger, a pointed pen (a stylus), and the like. Further, since the surface of the touch panel 13 overlaps the screen display section 17, visible information (variable operation section) 16, such as various buttons and icons, is displayed on the screen display section 17, as shown in FIG. 1. These pieces of visible information and contacted positions on the touch panel 13 (user's operation positions) can be positionally associated with each other. Specifically, when the user touches the screen of the touch panel 13 so as to operate respective buttons and icons appearing on the screen display section 17, the touching action can be processed as input operation for (pressing) a specific button or icon corresponding to the touched position. Further, a function for allocating positions of buttons or icons displayed on the screen display section 17 can be changed as required, and hence the buttons or icons can be utilized as a variable operation section.

In the meantime, the stationary operation section 14 is built for each button from a plurality of physical independent switches and buttons, and the configuration of the stationary operation section and labels of the respective buttons (details of prints) cannot be changed.

During normal operation, the user is assumed to operate the visible information (the variable operation section) 16 displayed on the screen display section 17 by way of the touch panel 13 in a condition that the enclosure of the terminal is compact as shown in FIG. 1(a). However, for instance, when desired to input a text at high speed, the user can perform efficient input operation by inputting a text through use of the stationary operation section 14. Accordingly, under such a situation, the user changes the shape of the enclosure as shown in FIG. 1(b) to switch the enclosure into the state where the stationary operation section 14 becomes exposed, thereby performing input operation.

Incidentally, in such a state as shown in FIG. 1(a), the user can touch all positions on the screen display section 17 by moving only a thumb 15b without using a hand 15, to thus be able to easily operate all of the pieces of visible information (the variable operation section) 16. However, the stationary operation section 14 as well as an entire area on the screen display section 17 become also an object of operation, as shown in FIG. 1(b). Therefore, not all of the buttons can be operated by moving only the thumb 15a. For instance, in order to enable the user to touch any position in an area 13a shown in FIG. 1(b), it is necessary to shift a positional relationship between the hand 15 of the user and the enclosure or to perform operation by use of both hands, which in turn deteriorates ease of operation.

For these reasons, in the present embodiment, a status of the visible information (the variable operation section) 16 displayed on the screen display section 17 is switched according to a change in the shape of the enclosure of the terminal. Specifically, in the embodiment shown in FIG. 1(a), the visible information (the variable operation section) 16 is uniformly arranged over the entire area of the screen display section 17. On the contrary, in the embodiment shown in FIG. 1(b), the visible information (the variable operation section) 16 is relocated to a position close to a lower side of the screen display section 17. As a result, even in the shape of the enclosure shown in FIG. 1(b), all of the pieces of visible information (the variable operation section) 16 are positionally close to the stationary operation section 14. Therefore, the user can operate all of the buttons of the stationary operation section 14 and the visible information (the variable operation section) 16 by moving only the thumb 15a.

FIG. 2 shows an example configuration of the portable terminal device shown in FIG. 1. FIG. 2(a) shows a configuration of hardware, and FIG. 2(b) shows a configuration of software including a program and data executed by a microcomputer (CPU) 19.

As shown in FIG. 2(a), the portable terminal device has the touch panel 13, the screen display section 17, a shape change detection sensor 18, the microcomputer 19, and a numeric keypad 20. Elements other than those relevant to input operation are omitted from FIG. 2.

As shown in FIG. 1, the touch panel 13 and the screen display section 17 are arranged while exposed on the front face of the upper enclosure 11. The shape change detection sensor 18 is a sensor for detecting a change in relative positional relationship between the upper enclosure 11 and the lower enclosure 12 and can identify a difference in shape between a state shown in FIG. 1(a) and a state shown in FIG. 1(b). The numeric keypad 20 is a physical keyboard corresponding to the stationary operation section 14 shown in FIG. 1 and includes a set of 12 switches and buttons.

By the software configured as shown in FIG. 2(b), the microcomputer 19 performs various processing operations pertaining to user's input operation. Specifically, the microcomputer performs processing for changing display contents of the screen display section 17 in accordance with a signal output from the shape change detection sensor 18 or accepting the user's input operation by processing a signal input by way of the touch panel 13 or the numeric keypad 20.

Software executed by the microcomputer 19, such as a program and data, include elements of a shape change detection section 21, a display mode switch section 22, a screen update section 23, and an operation detection section 24, as shown in FIG. 2(b). The display mode switch section 22 is provided with a display mode management section 25, a display mode determination section 26, and a display screen generation section 27.

The shape change detection section 21 processes a signal output from the shape change detection sensor 18 and reports the shape change to the display mode switch section 22 when the shape of the enclosure of the terminal has changed. Specifically, when the shape of the enclosure has changed from a (contracted) state shown in FIG. 1(a) to an (extended) state shown in FIG. 1(b) and when the shape of the same has changed from an (extended) state shown in FIG. 1(b) to a (contracted) state shown in FIG. 1(a), a notice of switching is issued.

The display mode switch section 22 prepares a screen of a display mode suitable for a state achieved after the shape of the enclosure has changed. The display mode management section 25 manages respective shapes of the enclosure of the terminal and corresponding display modes subject to transition in an associated manner. The display mode determination section 26 determines a display mode subject to transition. The display screen generation section 27 generates a screen of a display mode subject to transition.

The screen update section 23 displays on the screen display section 17 a screen of contents prepared by the display mode switch section 22 in order to update a screen of a transitioned display mode.

The operation detection section 24 processes a signal output from the numeric keypad 20 and a signal output from the touch panel 13, thereby accepting input operation performed by the user. The signal output from the touch panel 13 is positional information showing a position contacted by the finger. Therefore, which one of the pieces of visible information 16 is operated is identified by a comparison between the positional information and displayed positions of the respective pieces of the visible information 16. Information about the displayed positions of the respective pieces of visible information 16 are updated to the latest contents of the display mode in response to a mode switch of the display mode switching section 22.

As shown in FIG. 3(b), the display mode management section 25 has a display mode management table 28. The display mode management table 28 retains information for bringing respective shapes of the enclosure of the terminal in correspondence with corresponding display modes subject to transition. Specifically, the display mode management table retains information for bringing a contracted state of the enclosure into correspondence with a "contracted mode" as shown in FIG. 1(a) and information for bringing an extended state of the enclosure into correspondence with an "extended mode" as shown in FIG. 1(b).

As shown in FIG. 3(a), the display screen generation section 27 has an extended mode screen generation section 27a and a contracted mode screen generation section 27b. The extended mode screen generation section 27a generates a screen corresponding to the "extended mode" of the display mode management table 28. The contracted mode screen generation section 27b generates a screen corresponding to the "contacted mode" of the display mode management table 28.

In relation to switchable modes of the visible information (the variable operation section) 16 displayed on the screen display section 17, there are prepared a "first mode," a "second mode," a "third mode," a "fourth mode," and a "fifth mode" in addition to the "extended mode" and the "contracted mode" managed by the display mode management section 25. These modes are used in any of various combinations, such as those shown in FIG. 4.

FIG. 5 shows processing specifics of the microcomputer 19 pertaining to the display switch of the visible information (variable operation section) 16 of the portable terminal device shown in FIG. 1. FIG. 5(a) shows specifics of basic processing, and FIG. 5(b) shows specifics of more detailed processing. Processing assigned the same step numbers in FIGS. 5(a) and 5(b) denote identical processing operations.

Processing shown in FIG. 5(a) is first described. In step S11, the shape change detection section 21 monitors a signal output from the shape change detection sensor 18, thereby checking occurrence of a shape change. When the shape change is detected, processing proceeds to step S12. The shape change detection section 21 acquires shape information showing the contracted state of the enclosure as shown in FIG. 1(a) or the extended state of the enclosure as shown in FIG. 1(b).

In step S13, the display mode switch section 22 generates a screen of a display mode appropriate for the changed state by use of the shape information acquired by the shape change detection section 21.

In step S14, the screen update section 23 updates the configuration of the visible information (the variable operation section) 16 displayed on the screen display section 17 to contents of a new screen generated by the display mode switch section 22 in step S13.

Specifics of step S13 shown in FIG. 5(a) can be specifically processed in steps S15, S16, and S17 shown in FIG. 5(b).

In step S15, the display mode determination section 26 of the display mode switch section 22 performs a search through the display mode management table 28 in the display mode management section 25 by use of the shape information acquired from the shape change detection section 21 as a key.

In step S16, the display mode determination section 26 acquires from the display mode management table 28 information about a display mode to which transition has been made, as a result of search performed in step S15.

In step S17, the display screen generation section 27 generates a corresponding screen in accordance with the information acquired by the display mode determination section 26 in step S16 about the display mode to which transition has been made.

FIGS. 6 through 9 show specific example configurations of the visible information (variable operation section) 16 displayed on the screen display section 17 in the respective display modes.

Figure 6:
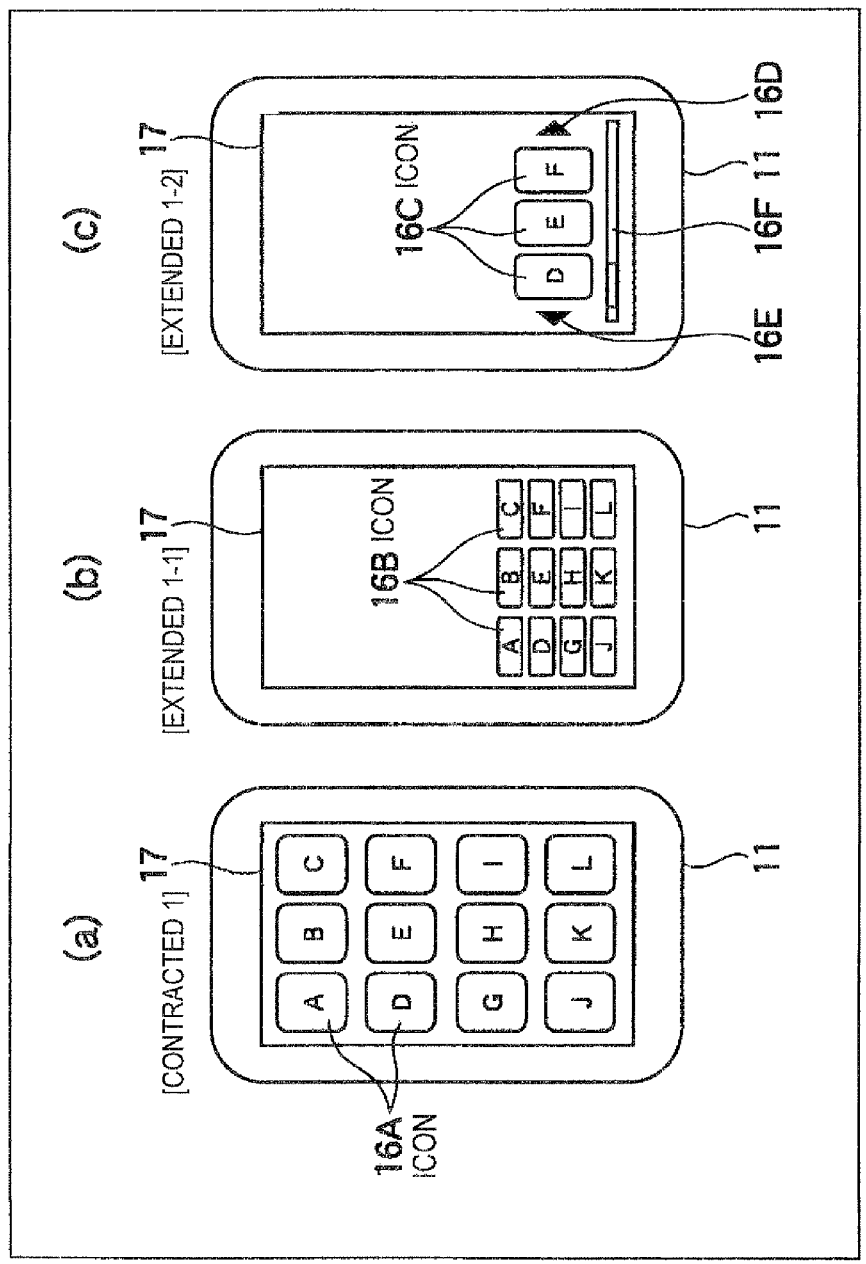
FIG. 6 It is a front view showing specific example display contents (1) relating to a screen of the portable terminal device shown in FIG. 1.

First, example screen configurations shown in FIG. 6 are described.

Twelve independent icons 16A are evenly arranged over the entire area of the screen display section 17 on the screen shown in FIG. 6(a). A screen (contracted 1) is applied to a combination of a "contacted mode" and a "first mode" shown in FIG. 4.

Twelve independent icons 16B are arranged only in an area close to a lower side of the screen display section 17 (i.e., a position close to the stationary operation section 14) on the screen shown in FIG. 6(b) and in a smaller size than are the icons shown in FIG. 6(a). A screen (extended 1-1) is applied to a combination of the "extended mode" with the "first mode" shown in FIG. 4.

Three icons 16C selected from the twelve icons, a left scroll button 16E, a right scroll button 16D, and a slider 16F are arranged, on the screen shown in FIG. 6(c), in only the area close to the lower side of the screen display section 17 (a position close to the stationary operation section 14) in the same size as are the icons shown in FIG. 6(a). The displayed three icons 16C change to other icons as a result of operation of any of the scroll buttons 16D and 16E or the slider 16F. A screen (extended 1-2) is applied to a combination of the "extended mode" with the "first mode" shown in FIG. 4.

For instance, when the screen display section 17 is used as a menu launcher for launching various application programs, preferable operability is usually acquired as a result of icons 16A of comparatively large size being uniformly arranged over the entirety of the screen display section 17 as in the screen shown in FIG. 6(a). However, in the extended state of the enclosure, such as that shown in FIG. 1(b), the thumb 15a cannot readily reach an upper side of the screen display section 17. For this reason, the icons 16B are arranged in a reduced size in the area close to the lower side of the screen display section 17 as shown in FIG. 6(b), whereby operability can be improved. The icons reduced in size involve deterioration of operability, and hence, as shown in FIG. 6(c), only some icons 16C are displayed at a 1× magnification, and switching of a display is enabled by scrolling operation, whereby operability can be improved.

Figure 7:
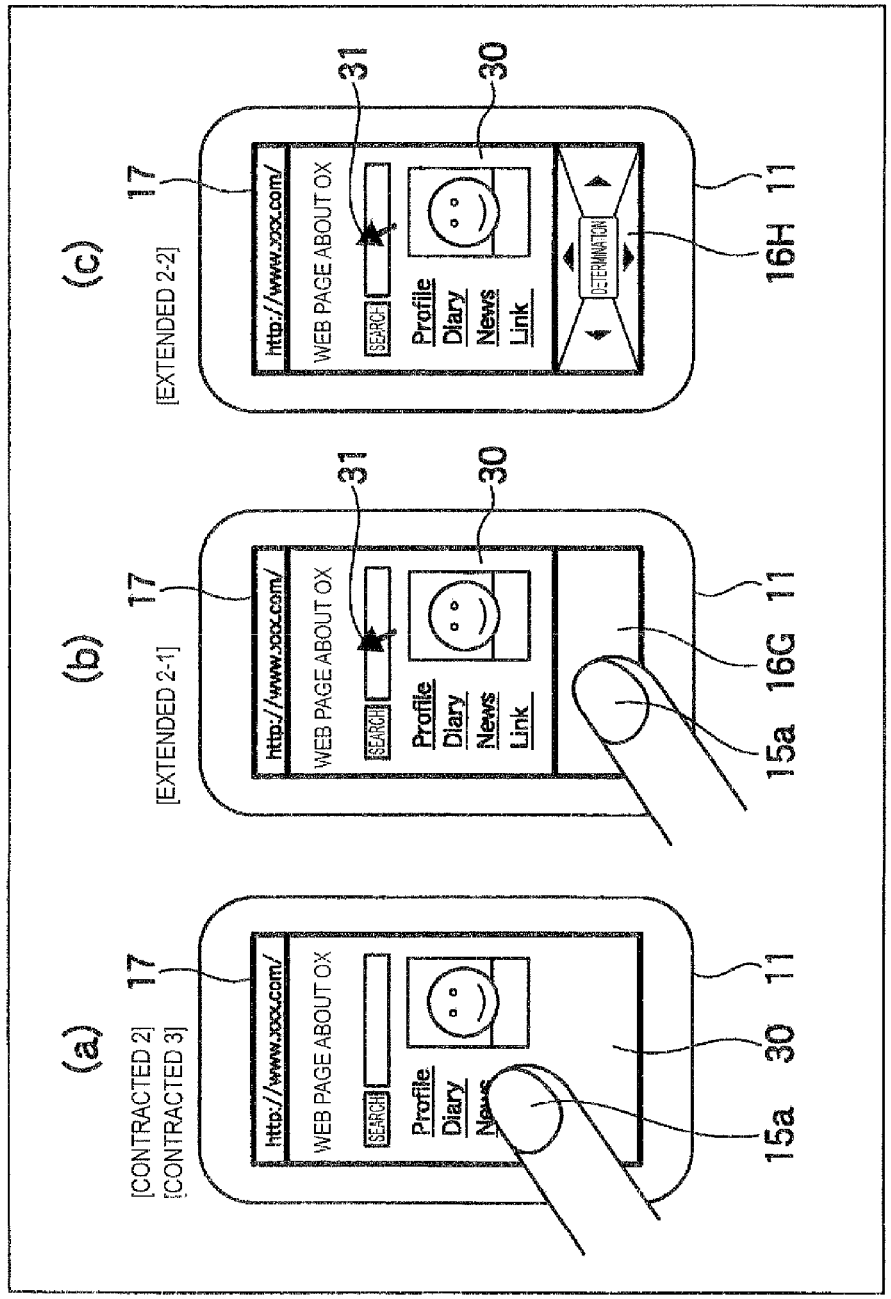
FIG. 7 It is a front view showing specific example display contents (2) relating to the screen of the portable terminal device shown in FIG. 1.

Examples shown in FIG. 7 are based on the assumption that the screen display section 17 of the terminal displays displayable contents, like a Web page, by use of a Web browser.

Display contents 30 are displayed over the entire area of the screen display section 17 of the terminal on a screen shown in FIG. 7(a), and the entire area is assigned as an operation section that can be operated by the thumb 15a. A screen (contraction 2, contraction 3) is applied to a combination of the "contacted mode" with a "second mode" or "third mode" shown in FIG. 4.

In the meantime, an operable icon 16G is arranged in an area close to the lower side of the screen display section 17 (the position close to the stationary operation section 14) on a screen shown in FIG. 7(b), and the display contents 30 are displayed in an area other than the lower area. Further, a movable pointer 31 is displayed on the display contents 30. Namely, the pointer 31 can be moved by operation of the icon 16G, and an arbitrary position on the display contents 30 can be clicked. The screen (extended 2-1) is applied to a combination of the "extended mode" with the "second mode" shown in FIG. 4.

Likewise, an operable icon 16H is arranged in the area close to the lower side of the screen display section 17 (a position close to the stationary operation section 14) on a screen shown in FIG. 7(c). The display contents 30 are displayed in an area other than the lower area. Further, the movable pointer 31 is displayed on the display contents 30. Namely, the pointer 31 can be moved by operation of the icon 16H, and an arbitrary position on the display contents 30 can be clicked. The screen (extended 2-2) is applied to a combination of the "extended mode" with the "second mode" shown in FIG. 4.

Figure 8:
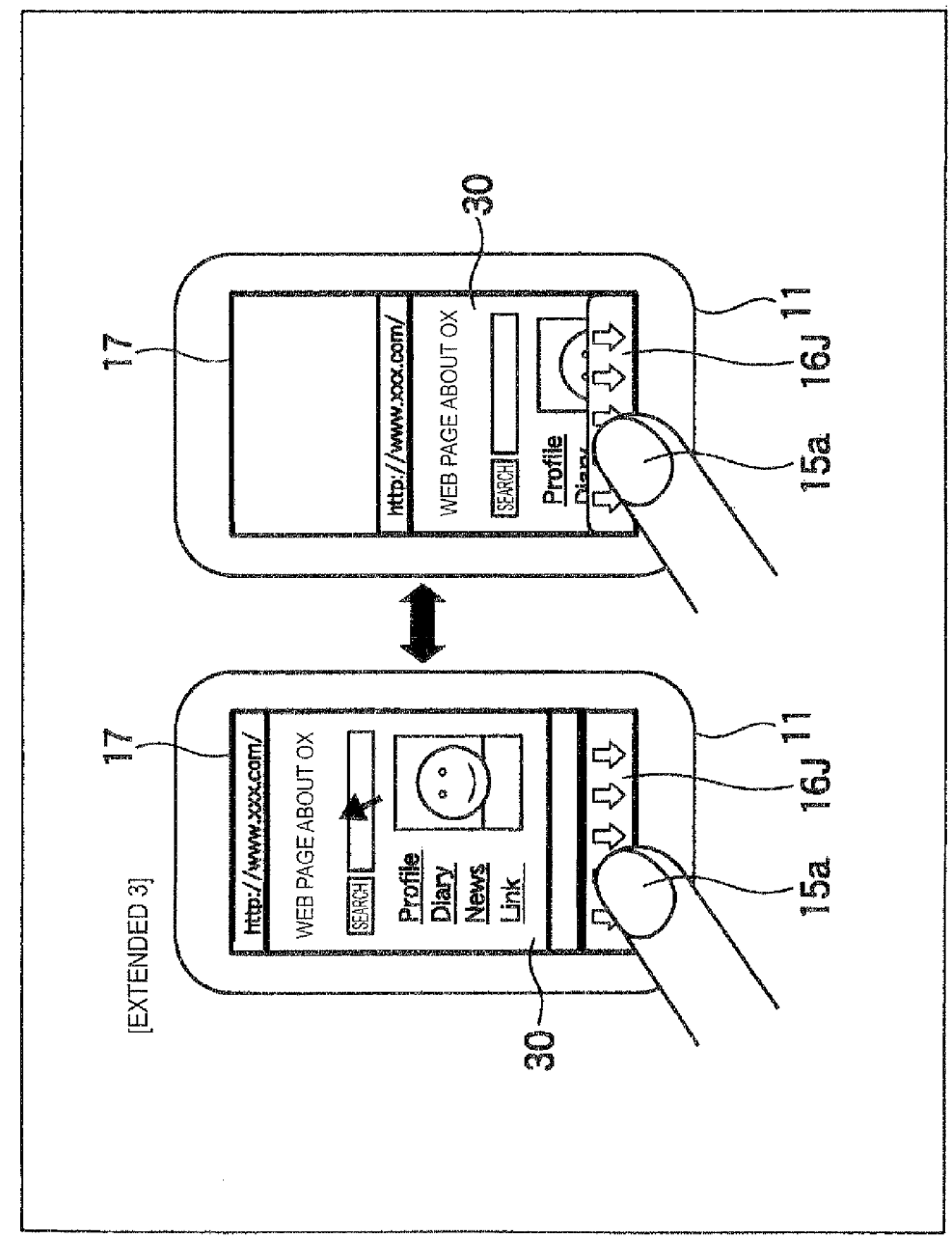
FIG. 8 It is a front view showing specific example display contents (3) relating to the screen of the portable terminal device shown in FIG. 1.

An operable icon 16J is arranged in the area close to the lower side of the screen display section 17 (a position close to the stationary operation section 14) on a screen shown in FIG. 8. The display contents 30 are displayed in an area other than the lower area. The icon 16J is assigned a function of input operation for scrolling the display contents 30 displayed on the screen display section 17 in the vertical direction of the screen. The screen (extended 3) is applied to a combination of the "extended mode" with the "third mode" shown in FIG. 4.

Figure 9:
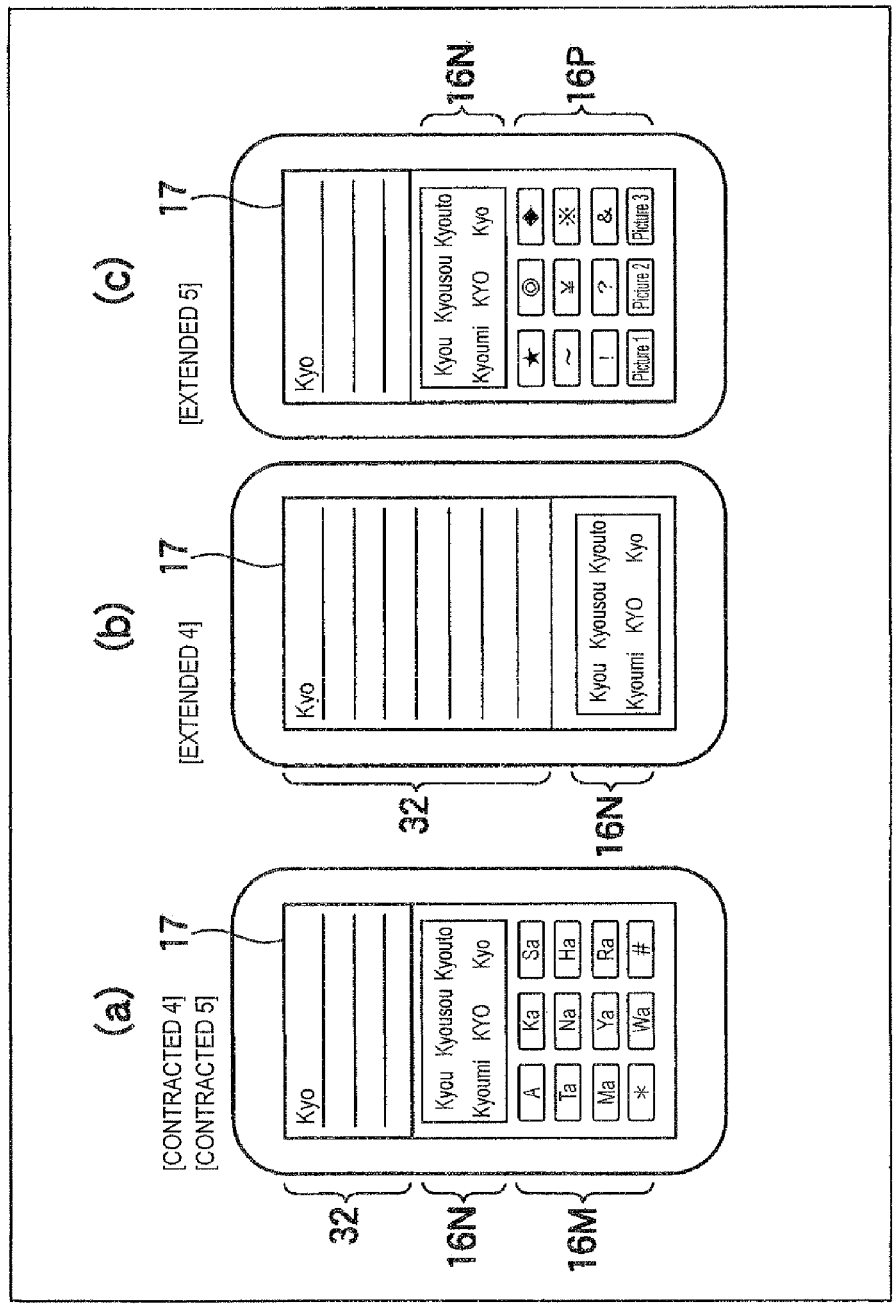
FIG. 9 It is a front view showing specific example display contents (4) relating to the screen of the portable terminal device shown in FIG. 1.

Examples shown in FIG. 9 are based on the assumption that a user inputs a message, such as a text, by use of an application program, such as a text editor.

An input message display section 32 is arranged in an upper one-third area of the screen display section 17 on a screen shown in FIG. 9(a), and a conversion candidate display section 16N is arranged in a center of the screen. Further, a virtual keyboard 16M is arranged in an area close to the lower side of the screen display section 17 (the position close to the stationary operation section 14). The virtual keyboard 16M has 12 operable icons suitable for inputting characters. The conversion candidate display section 16N displays a character string candidate for conversion responsive to a character or a sequence of characters input by operation of the virtual keyboard 16M, or the like. When a contact of a finger, or the like, is detected at a position where each of the candidate character string is displayed, the thus-contacted candidate is deemed to be selected by the user. The screen (contraction 4, 5) is applied to a combination of the "contracted mode" and a "fourth mode" or "fifth mode" shown in FIG. 4.

The virtual keyboard 16M shown in FIG. 9(a) is deleted from a screen shown in FIG. 9(b), and the conversion candidate display section 16N is arranged in the area close to the lower side of the screen display section 17 (the position close to the stationary operation section 14), and the input message display section 32 is arranged in an area other than the lower area. The screen (extended 4) is applied to the combination of the "extended mode" with the "fourth mode" shown in FIG. 4. Specifically, the screen is based on the assumption that the enclosure is extended and that characters are input by the stationary operation section 14. Therefore, the virtual keyboard 16M is obviated. As a result of the conversion candidate display section 16N moving to a range where the thumb 15a is movable, operability is thereby enhanced.

A virtual keyboard 16P is arranged in the area close to the lower side of the screen display section 17 (the position close to the stationary operation section 14) on a screen shown in FIG. 9(c) in place of the virtual keyboard 16M shown in FIG. 9(a). Respective buttons of the virtual keyboard 16P are assigned symbols differing from general characters, or the like. The screen (extended 5) is applied to the combination of the "extended mode" with the "fifth mode" shown in FIG. 4. Specifically, the screen is based on the assumption that characters are entered by way of the stationary operation section 14 with the enclosure extended. Hence, general characters are input by the stationary operation section 14, and symbols other than the characters are input by virtual keyboard 16P located at the position where the thumb reaches the keyboard, whereby operability is enhanced.

The present embodiment is based on a case where the shape of the enclosure of the terminal changes such that the enclosure of the terminal extends or contacts in a longitudinal direction. Likewise, the present invention can also cope with shape changes other than that mentioned above; for instance, a shape change caused by rotation. Specifically, it is important to relocate buttons that are operation targets to be frequently operated, and the like, to a range where the thumb 15a reaches the buttons, in accordance with a change in the shape of the buttons.

The present embodiment is based on a case where control is performed by use of a computer and software, including a program and data, executed by the computer. The portable terminal device can also be configured by only custom-designed hardware allocated a similar control function.

Second Embodiment

Another specific embodiment of the portable terminal device, the display control method, and the display control program of the present invention is now described by reference to FIGS. 10 through 13.

Figure 10:
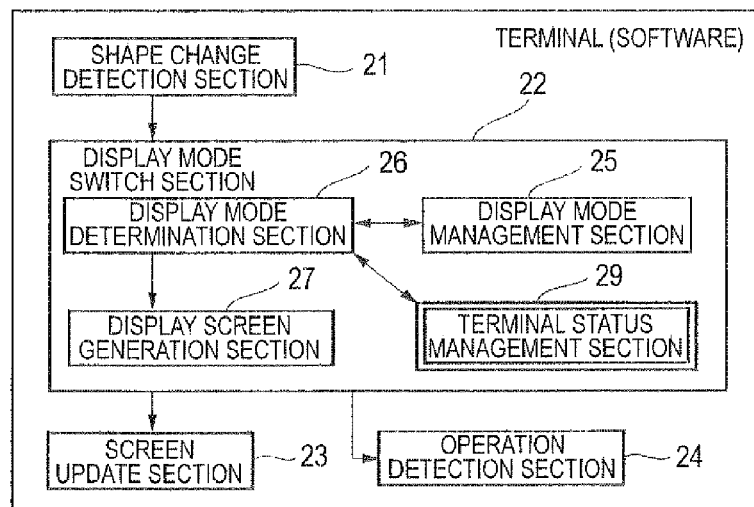
FIG. 10 It is a block diagram showing an example configuration of a principal section of software of a portable terminal device of a second embodiment.
Figure 11:
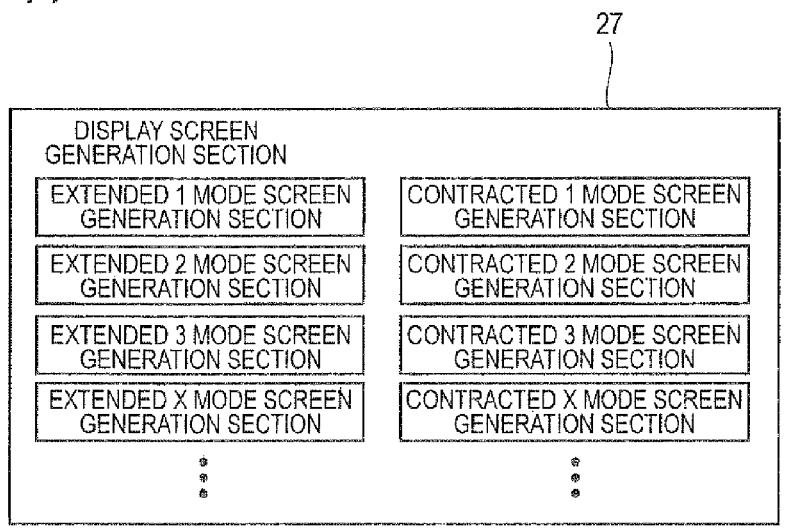
FIG. 11 It is a block diagram showing an internal configuration of the display screen generation section shown in FIG. 10.
Figure 13:
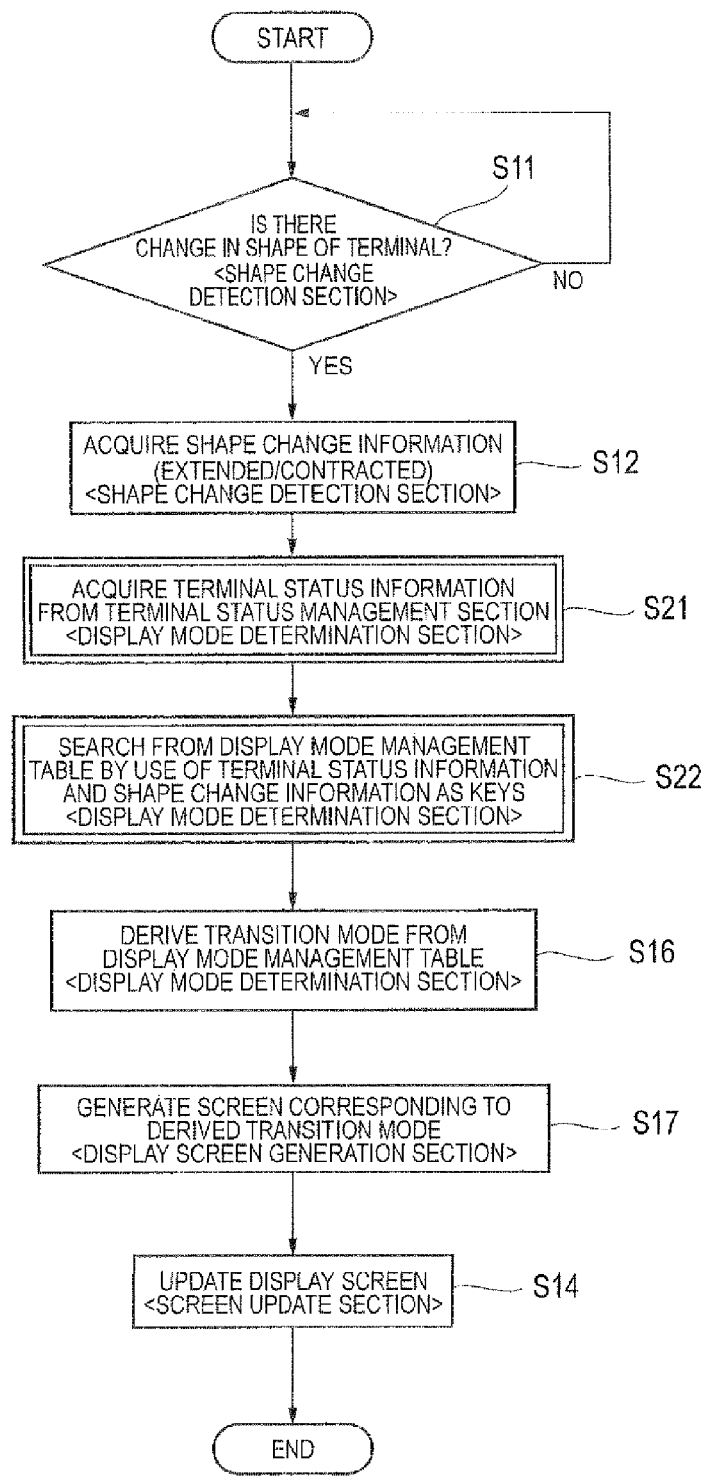
FIG. 13 It is a flowchart showing operation pertaining to a display of the portable terminal device shown in FIG. 10.

FIG. 10 is a block diagram showing an example configuration of a principal section of software of a portable terminal device of a second embodiment. FIG. 11 is a block diagram showing an internal configuration of a display screen generation section shown in FIG. 10. FIG. 12 is a schematic diagram showing a specific example display mode management table provided in the portable terminal device shown in FIG. 10. FIG. 13 is a flowchart showing operation pertaining to a display of the portable terminal device shown in FIG. 10.

The second embodiment is a modification of the first embodiment. In FIGS. 10 through 13, elements or steps corresponding to those described in connection with the first embodiment are assigned the same reference symbols or numerals. A configuration and operation unique to the second embodiment are hereinbelow described.

Even in the present embodiment, the hardware of the portable terminal device is assumed to have a configuration similar to that shown in FIG. 2(a). FIG. 10 shows the configuration of the software of the second embodiment. As shown in FIG. 10, a terminal status management section 29 is additionally provided in the display mode switch section 22 in the second embodiment.

The terminal status management section 29 performs processing for ascertaining an operating status of the terminal. Specifically, the type of an application program executed by the microcomputer 19 that controls the terminal is identified, to thus ascertain a difference in operating status of the terminal.

As shown in FIG. 11, in the second embodiment, an extended 1 mode screen generation section, an extended 2 mode screen generation section, an extended 3 mode screen generation section, an extended X mode screen generation section, . . . , a contraction 1 mode screen generation section, a contraction 2 mode screen generation section, a contraction 3 mode screen generation section, a contracted X mode screen generation section, . . . , are provided in the display screen generation section 27. These screen generation sections are provided for generating screens for the respective modes.

In the second embodiment, a display mode management table 28B, such as that shown in FIG. 12, is provided in the display mode management section 25. As shown in FIG. 12, pieces of information showing correlation among a distinction as to a terminal status (A, B, and C showing distinctions among operating application programs), a difference between terminal shapes (an extended shape/a contracted shape), and display modes subjected to transition are registered in the display mode management table 28B in a mutually-associated fashion.

The "extended 1 mode," the "extended 2 mode," and the "extended 4 mode" of the display mode in the display mode management table 28B shown in FIG. 12 correspond to; for instance, the combinations of the "first mode," the "second mode," and the "fourth mode" with the "extended mode" shown in FIG. 4. The "contraction 1 mode," the "contraction 2 mode," and the "contraction 4 mode" correspond to; for instance, the combinations of the "first mode," the "second mode," and the "fourth mode" with the "contracted mode" shown in FIG. 4.

When the display mode management table 28B shown in FIG. 12 is used; for instance, when the application program running in the terminal is a Web browser and when a terminal shape detected by the shape change detection section 21 is an "extended" shape, the display mode transitions to the "extended 2 mode."

FIG. 13 shows operation of the terminal described in connection with the second embodiment. In processing shown in FIG. 13, processing pertaining to steps S21 and S22 differs from that shown in FIG. 5. Specifically, in step S21, the display mode determination section 26 acquires from the terminal status management section 29 terminal status information showing an operating status of the terminal (a distinction among the application programs). In step S22, the display mode determination section 26 searches from the display mode management table 28B while taking the terminal status information acquired in step S21 and the shape change information acquired in step S12 as keys. A search result is used in the next step S16.

Accordingly, in the second embodiment, it is possible to automatically change positions, size, and the number of the pieces of operable visible information (the variable operation section) 16 on the screen display section 17 so as to enable performance of more efficient input operation not only by adapting to a change in shape of the enclosure of the terminal but also by conforming to a difference between running application programs.

The present patent application is based on Japanese Patent Application No. 2007-340356 filed on Dec. 28, 2007 in Japan, the entire subject matter of which is incorporated herein by reference.

Although various embodiments of the present invention have been described thus far, the present invention is not limited to the matters described in connection with the embodiments. The present invention is also scheduled to be subjected to alterations or applications which will be contrived by those who are skilled in the art on the basis of the descriptions of the specification and the well-known technique, and the alterations and applications shall also fall within the range where protection of the present invention is sought.

INDUSTRIAL APPLICABILITY

As mentioned above, the portable terminal device, the display control method, and the display control program of the present invention are useful for improving user's operability when applied to a device having a deformable enclosure, a touch panel, a variable operation section (a changeable operation section on the touch panel), and a stationary operation section (a physically-existing numeric keypad, or the like); for instance, a portable terminal like a portable phone terminal, a portable information terminal, and a portable music player.

The invention claimed is:

1. A portable terminal device comprising:
a first enclosure; and
a second enclosure, the first enclosure and the second enclosure being slidable relative to each other, wherein the first enclosure and the second enclosure are enabled to occupy a contracted state or an extended state;
a display section provided on the first enclosure; and
a stationary operation section provided on the second enclosure,
wherein the display section is configured to display, when a character is input in the contracted state of the first enclosure and the second enclosure, a virtual keyboard and candidates for conversion; and
wherein the display section is configured to display, when the character is input in the extended state of the first enclosure and the second enclosure, the candidates for conversion at a position which is closer to the stationary operation section than an upper end position of the virtual keyboard displayed in the contracted state, without displaying the virtual keyboard.

2. The portable terminal device according to claim 1, wherein the display section displays the candidates for conversion at a first region when the character is input in the contracted state; and
wherein the display section displays the candidates for conversion at a position which is closer to the stationary operation section than the first region and the upper end position of the virtual keyboard when the character is input in the extended state.

3. A portable terminal device comprising:
a first enclosure; and
a second enclosure, the first enclosure and the second enclosure being slidable relative to each other, wherein the first enclosure and the second enclosure are enabled to occupy a contracted state or an extended state;
a touch panel and a display section provided on the first enclosure; and
a stationary operation section provided on the second enclosure,
wherein the display section is configured to display, when a character is input in the contracted state of the first enclosure and the second enclosure, a virtual keyboard and candidate character strings; and
wherein the display section is configured to display, when the character is input in the extended state of the first enclosure and the second enclosure, the candidate character strings at a position which is closer to the stationary operation section than an upper end position of the virtual keyboard displayed in the contracted state, without displaying the virtual keyboard.

4. The portable terminal device according to claim 3, wherein the display section displays the candidate character strings at a first region when the character is input in the contracted state; and
wherein the display section displays the candidate character strings at a position which is closer to the stationary operation section than the first region and the upper end position of the virtual keyboard when the character is input in the extended state.

5. A display control method of a portable terminal device including a first enclosure provided with a display section and a second enclosure provided with a stationary operation section, the first enclosure and the second enclosure being slidable relative to each other such that the first enclosure and the second enclosure are enabled to occupy a contracted state or an extended state, the display control method comprising:
displaying, when a character is input in the contracted state of the first enclosure and the second enclosure, a virtual keyboard and candidates for conversion; and
displaying, when a character is input in the extended state of the first enclosure and the second enclosure, the candidates for conversion at a position on the display section which is closer to the stationary operation section than an upper end position of the virtual keyboard displayed in the contracted state, without displaying the virtual keyboard on the display section.

6. The display control method according to claim 5, further comprising:

displaying the candidates for conversion at a first region on the display section when the character is input in the contracted state; and displaying the candidates for conversion at a position which is closer to the stationary operation section than the first region and the upper end position of the virtual keyboard when the character is input in the extended state.

7. A display control method of a portable terminal device including a first enclosure provided with a display section and a second enclosure provided with a stationary operation section, the first enclosure and the second enclosure being slidable relative to each other such that the first enclosure and the second enclosure are enabled to occupy a contracted state or an extended state, the display control method comprising:

displaying, when a character is input in the contracted state of the first enclosure and the second enclosure, a virtual keyboard and candidate character strings; and displaying, when a character is input in the extended state of the first enclosure and the second enclosure, the candidate character strings at a position on the display section which is closer to the stationary operation section than an upper end position of the virtual keyboard displayed in the contracted state, without displaying the virtual keyboard on the display section.

8. The display control method according to claim 7, further comprising:

displaying the candidate character strings at a first region on the display section when the character is input in the contracted state; and displaying the candidate character strings at a position which is closer to the stationary operation section than the first region and the upper end position of the virtual keyboard when the character is input in the extended state.

* * * * *